(12) United States Patent
Punjabi

(10) Patent No.: US 7,113,775 B2
(45) Date of Patent: Sep. 26, 2006

(54) SELF-LEARNING INTELLIGENT CALL ROUTING GATEKEEPER

(75) Inventor: Anil Punjabi, San Jose, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 510 days.

(21) Appl. No.: 09/900,267

(22) Filed: Jul. 6, 2001

(65) Prior Publication Data

US 2003/0008642 A1   Jan. 9, 2003

(51) Int. Cl.
*H04M 3/42* (2006.01)
*H04Q 7/20* (2006.01)

(52) U.S. Cl. ................. 455/417; 455/445; 379/207.03; 379/211.02

(58) Field of Classification Search ................ 370/352, 370/409; 455/445; 379/201.02, 201.07, 379/201.01; 709/206
See application file for complete search history.

(56) References Cited

U.S. PATENT DOCUMENTS

| | | | | |
|---|---|---|---|---|
| 5,905,789 A | * | 5/1999 | Will | 379/211.03 |
| 6,104,799 A | * | 8/2000 | Jain et al. | 379/211.01 |
| 6,119,006 A | | 9/2000 | Shaffer et al. | 455/440 |
| 6,144,671 A | * | 11/2000 | Perinpanathan et al. | 370/409 |
| 6,421,339 B1 | * | 7/2002 | Thomas | 370/352 |
| 6,622,016 B1 | * | 9/2003 | Sladek et al. | 379/201.01 |
| 6,678,366 B1 | * | 1/2004 | Burger et al. | 379/211.03 |
| 6,898,274 B1 | * | 5/2005 | Galt et al. | 379/211.02 |
| 6,950,650 B1 | * | 9/2005 | Roeder | 455/417 |
| 7,006,833 B1 | * | 2/2006 | Contractor | 455/456.1 |
| 2002/0116464 A1 | * | 8/2002 | Mak | 709/206 |

OTHER PUBLICATIONS

U.S. Appl. No. 09/071,716, filed May 1, 1998, titled "Apparatus and Method for Calendar Based Call Routing".
U.S. Appl. No. 09/469,550, filed Dec. 22, 1999, titled "System and Method for Calendar-Based Cellular Smart Switching".

* cited by examiner

*Primary Examiner*—Fan Tsang
*Assistant Examiner*—Lisa Hashem

(57) ABSTRACT

A gatekeeper (109) including a compare unit (204) and a record unit (206). The compare unit (204) receives call requests and accesses a database which is a record of where a called party picked up the call, e.g., at home, at the office, via a mobile phone, or via an emergency number. The compare unit (204) performs an analysis such as a "closest neighbor" analysis to determine the location of the user at the time of day closest to that of the present call. The call is then routed to the user at that location. The record unit (206) then makes the appropriate notation in the database for the latest call.

16 Claims, 6 Drawing Sheets

SELF-LEARNING INTELLIGENT CALL ROUTING GATEKEEPER

BACKGROUND OF THE INVENTION

1. Field of the Invention

The present invention relates to communications systems and, in particular, to an improved system for providing routing in a gatekeeper in an IP telephone network.

2. Description of the Related Art

The Internet Protocol (IP) is one of the most popular packet communication and networking protocols being used today. It finds use both on the Internet and in wide area networks (WANs) and local area networks (LANs), such as asynchronous transfer mode (ATM) and Ethernet networks. The promise of inexpensive voice telephony using the Internet has led to extensive interest in "Voice over IP" (VoIP) and "Telephony over LAN" (ToL) applications. In particular, several IP telephony protocols have been developed, including the H.323 Recommendation suite of protocols promulgated by the International Telecommunications Union (ITU). Details concerning the H.323 Recommendation may be obtained from the International Telecommunications Union; the H.323 Recommendation is hereby incorporated by reference in its entirety as if fully set forth herein.

A gatekeeper is an H.323 entity that essentially provides routing and various control functionality. More particularly, the gatekeeper may be programmed with one or more numbers associated with system users, and will attempt to direct calls to the appropriate number. For example, a user may be provided with a work number (coupled to the LAN); a home number; a mobile number; and a voice mail number. When a call is received by the gatekeeper, the gatekeeper follows a set of routing rules to reach the called party.

In certain systems, gatekeeper tries one number after another (e.g., three or four rings in each case) until it is able to reach the user or all numbers associated with the user have been tried at least once. Because the system has no intelligence, it can take a long time before the user is reached.

In some systems, a user can set "time rules," wherein the call is routed to a user at a particular number at a particular time. However, such systems are unable to adapt to changes in the user's schedule unless the user manually changes the rules each time. A slight change in schedule could result in a long wait for anyone trying to contact the user.

SUMMARY OF THE INVENTION

These and other drawbacks in the prior art are overcome in large part by a system and method according to the present invention. A gatekeeper according to an implementation of the invention includes a compare unit and a record unit. The compare unit receives call requests and accesses a database which is a record of where a called party picked up the call, e.g., at home, at the office, via a mobile phone, or via an emergency number. If such functionality is activated by the user, the compare unit performs an analysis such as a "closest neighbor" analysis or other pattern matching to determine the location of the user at the time of day closest to that of the present call. The call is then routed to the user at that location. The record unit then makes the appropriate notation in the database for the latest call.

A method according to one embodiment of the invention includes receiving a call at a gatekeeper or gateway, accessing a database indicating a call and location history for the called party, and connecting the call to the called party at the location closest in time to the current time. The location or number at which the called party is located is recorded for use on subsequent calls.

A method according to another embodiment of the invention first accesses a user-defined time based rule at which the user may be reached for a time corresponding to the time of the call. If the user is not available at any of the locations specified, then the system tries to get the next nearest neighbor. The location or number at which the called party is located is recorded for use on subsequent calls.

BRIEF DESCRIPTION OF THE DRAWINGS

A better understanding of the invention is obtained when the following detailed description is considered in conjunction with the following drawings in which.

DETAILED DESCRIPTION OF THE INVENTION

Figure 1:
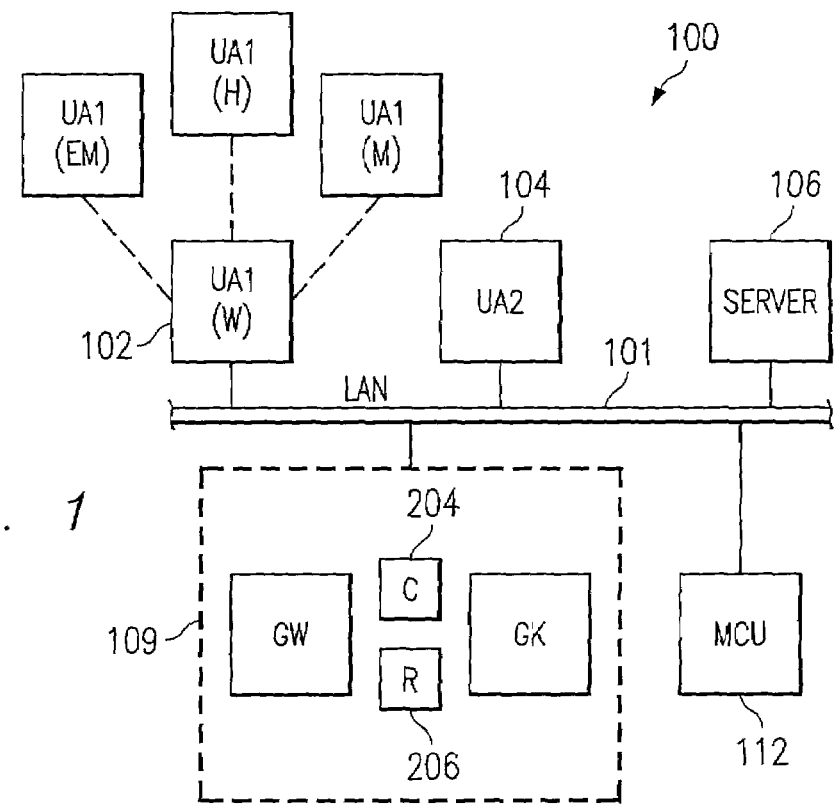
FIG. 1 is a diagram of a system according to an embodiment of the invention.

Turning now to the drawings, and with particular attention to FIG. 1, a diagram illustrating an exemplary IP protocol telecommunications system 100 according to an embodiment of the present invention is shown. In particular, the IP protocol communication system 100 may be embodied as an H.323 Recommendation-compatible system. It is noted that, while described herein with regard to an H.323 network, the invention is equally applicable to networks such as MGCP (Media Gateway Control Protocol), SIP+ (Inter MGS Protocol), SGCP, MEGACO, and generally, any voice or multimedia over IP scheme. Further, it is noted that an exemplary generic H.323 system is the HiPath™ 5000 system, available from Siemens Information and Communication Networks Inc.

The telecommunications system 100 includes a local area network (LAN) or packet network 101 and, particularly, and Ethernet LAN. Coupled to the LAN 301 may be a variety of H.323 terminals 102, 104 a multi-point control unit (MCU) 112, an H.323 gateway-gatekeeper 109, a LAN server 106, and a plurality of other devices such as personal computers (not shown). The H.323 terminals 102, 104 are in compliance with the H.323 Recommendation.

Gateway and gatekeeper functionality may be provided in separate entities, and are shown combined in FIG. 1 only for convenience. Typically, a gateway interfaces to external networks, such as the public switched telephone network, wireless networks, and the like. Gatekeeper functionality typically includes call set up and signaling functions.

In addition, as will be explained in greater detail below, according to an embodiment of the present invention, the gateway/gatekeeper 109 includes a compare unit 204 and a record unit 206 to determine a "closest neighbor" call and record the current call time, respectively.

Figure 2:
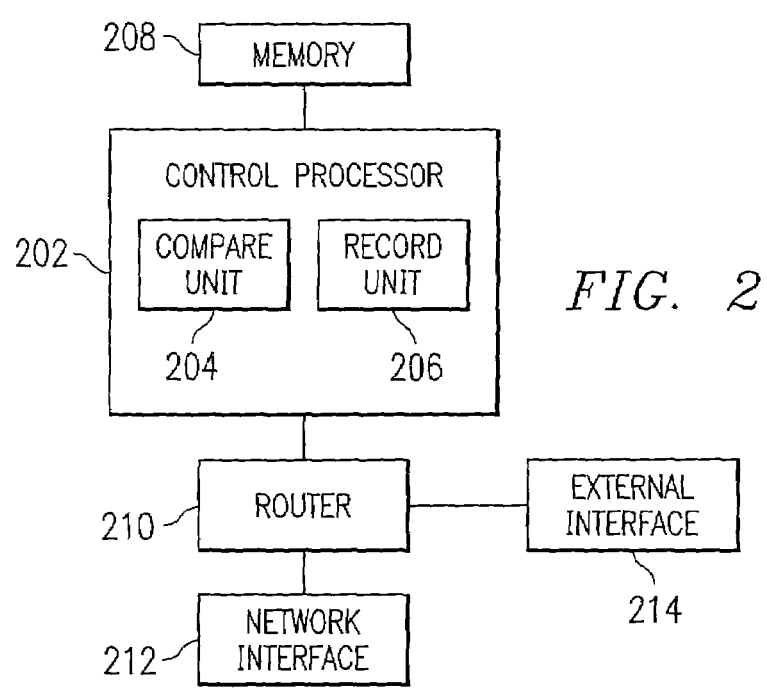
FIG. 2 is a block diagram of a gatekeeper according to an embodiment of the invention.

More particularly, FIG. 2 depicts a gateway-gatekeeper 109 according to an embodiment of the present invention. The gateway-gatekeeper 109 includes a control processor 202 implementing a compare unit module 204 and a record unit module 206. The compare unit 204 and the record unit 206 may be implemented as software. The control processor 202 is coupled to a memory 208 for storing software and a record database for use by the compare unit 204 and the record unit 206, as will be described in greater detail below. The control processor 202 further couples to a route 210 which receives signaling and data from a network interface 212 and an external network interface 214. The external network interface 214 couples to an external telecommunications network (not shown). The network interface 212 couples to the local area network.

In operation, a call is received from a calling party via either the external interface 214 or the network interface 212. The compare unit 204 determines, by accessing the suitable database in the memory 208, who the called party is, and performs a "closest neighbor" search to determine at which location the called party is most likely to be. The control processor 202 then connects the call to that destination. The record unit 206 records the time and destination of the call, thereby updating the "closest neighbor" database, in effect, learning the user's itinerary. In certain embodiments, as will be described in greater detail below, the self-learning procedure overrules a default set of connection rules. It is noted, however, that in certain implementations, the user can deactivate the self-learning features so that only the default set of connection rules are employed. For example, the user may enter one or more sets of key commands into a handset that are received by the gatekeeper, which then employs, for example, only the default number or numbers.

Figure 3:
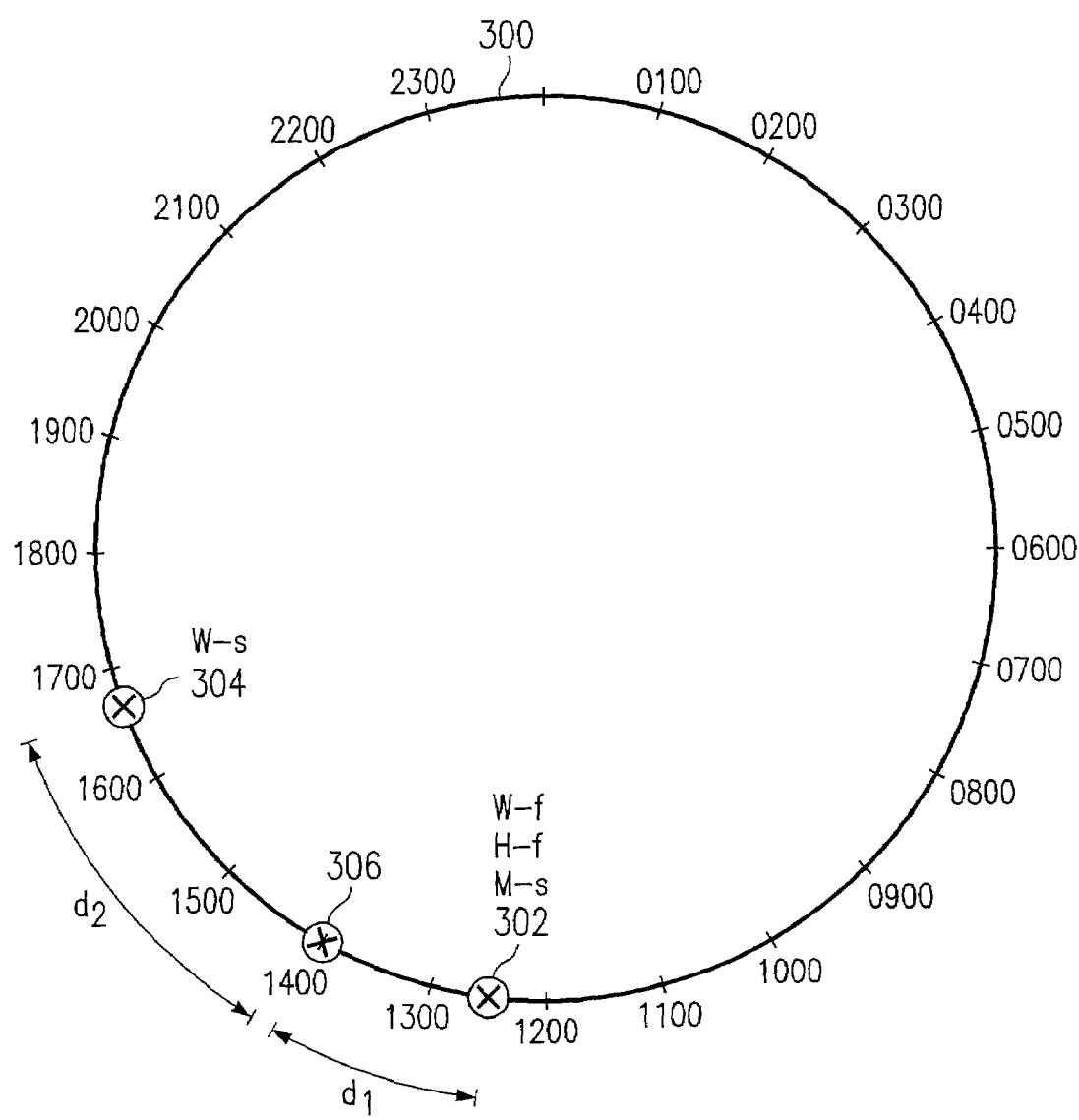
FIG. 3 is a diagram schematically illustrating operation of an embodiment of the invention.

Operation of an implementation of the invention is illustrated schematically in FIG. 3. Shown is a time dial 300, with 24 hour markings. In the example shown, the user may have a Work Number (W), a Home Number (H), a Mobile Number (M), and a n emergency number (EM). In the example illustrated, the call history database is empty. Initially, suppose the user receives a call 302 at 12:30 PM. Suppose at this time, the gatekeeper tries to connect the call to the user at work, and fails, at home and fails, but succeeds with the mobile number. The number and the time are recorded in the call history. Next, suppose that a call 304 comes in at 16:30 (4:30 PM) and the user picks up on the work number. This stores another record in the call history or rules database for this user.

Suppose the gatekeeper next gets a call request 306 at 1400 (2:00 PM) the next day. The compare unit 204 then accesses the database and determines the "distance" d1 and distance d2. Since d1 is closer, the gatekeeper 109 will attempt to call the user at the mobile number because that record is closest to 1400. When the call is connected, a record at 1400 is stored in the rules database. If the user cannot be reached at the mobile number, the gatekeeper 109 will attempt to contact the user at the next nearest neighbor, and so on.

Figure 4:
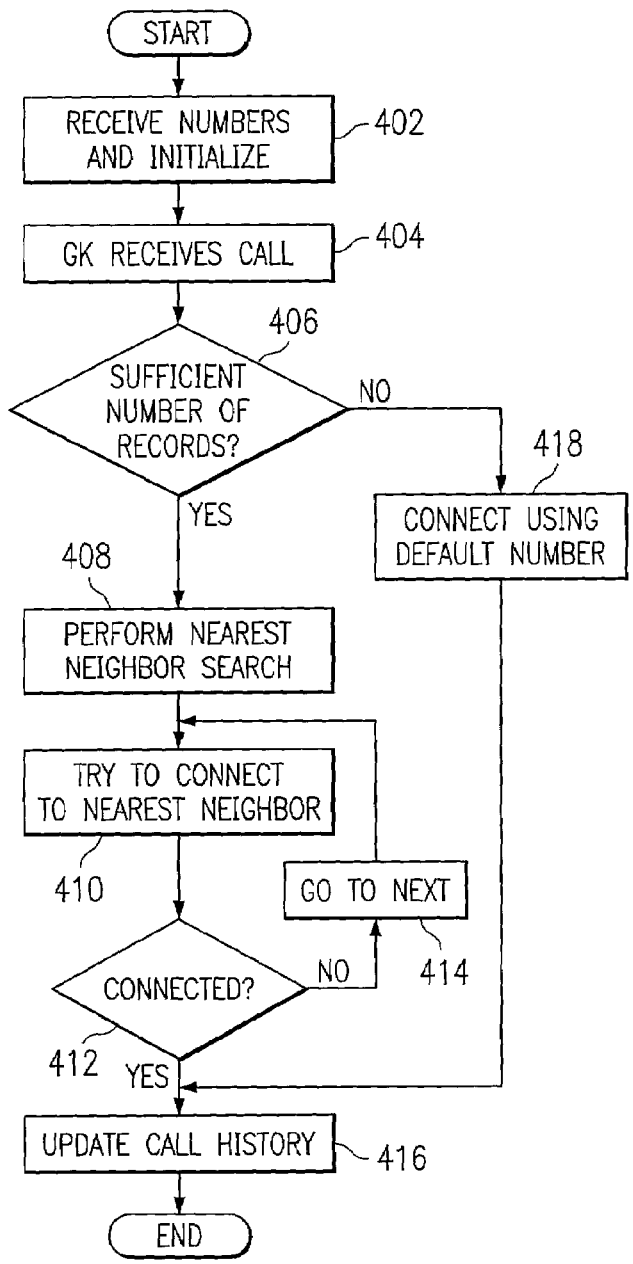
FIG. 4 is a flowchart illustrating operation of an embodiment of the invention.

A flowchart illustrating operation of an embodiment of the invention is shown in FIG. 4. In 402, the gatekeeper 109 receives numbers that are associated with a user. This may also include a default order if the rules database is not yet built. These are stored, for example, by the controller 202 in the memory 208. In 404, the gatekeeper 109 receives a call request for the user. In 406, the gatekeeper determines if there are a sufficient threshold of entries in the call history for the nearest neighbor determination to be made. An adequate number might be two (2), for example (or two within a particular time period). If not, then in 418, the gatekeeper 109 will try to route the call using the default strategy. Once connected, the rules database is updated, in 416. Otherwise, in 408, the compare unit 204 will perform the nearest neighbor comparison. Once a nearest neighbor is found, in 410, the gatekeeper 109 will try to connect to the nearest neighbor number. If the connection is successful, as determined in 412, then in 416, the record unit 206 updates the call history to include the current call. If not, then in 414, the compare unit 204 will cycle past the current number and will try to connect to the next nearest neighbor, and so on.

Figure 5:
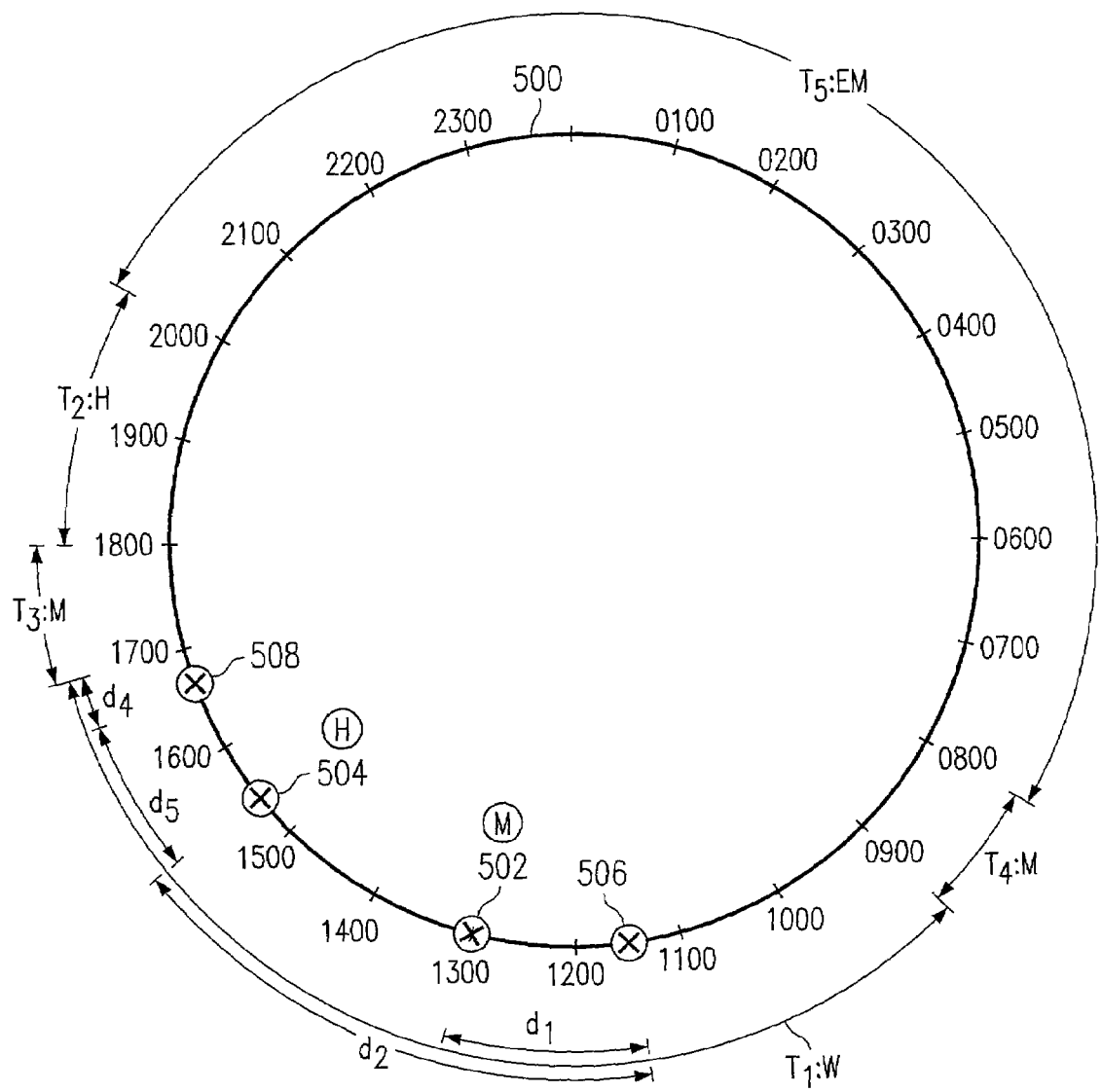
FIG. 5 is a diagram schematically illustrating operation of an embodiment of the invention.

Operation of another implementation of the invention is illustrated schematically in FIG. 5. Shown is a time dial 500, with 24 hour markings. The outer circle represents time based rules associated with a user. For example, the user may have a Work Number, a Home Number, a Mobile Number, and an Emergency Number. The gatekeeper 109 may be programmed to try to connect to the user during period T1 (9:00 AM to 4:59 PM) at the Work Number (W); to the user at Home during period T2 (6 PM to 7:59 PM); at the mobile number (M) during periods T3 (5 to 5:59 PM) and T4 (8 to 8:59 AM); and at the user's emergency number (EM) during period T5 (8 PM to 7:59 AM). Initially, then, the gatekeeper 109 will attempt to route the call as per the set rules. However, if the user is not available as per the set rules, then the system tries to get the nearest neighbor as discussed above. For example, suppose at 1 PM, 502, a call is received and the user is not connectable at the Work number, but the call is made through the Mobile number. The appropriate record is made in the rules database. Then, 3:30 PM, at 504, the user again cannot be reached at the Work number, but is reached at Home, which is recorded in the rules database. The next day, at 506 11:30 AM, the user again is not reachable at the Work number, so the system performs the nearest neighbor analysis. The system compares distance d1 and d2 to determine to try to connect the call to the user's Mobile number. It is noted that, in alternate embodiments, "closeness" to a time change may also be accommodated by the nearest neighbor test. That is, for example, a call is received at 4:30 PM, at 508, and the user is not reachable at Work. In this case, the nearest neighbor test uses the distance d5 to 504 and also the distance d4 to the transition to time period T3, it being relatively likely that the user has left for home early.

Figure 6:
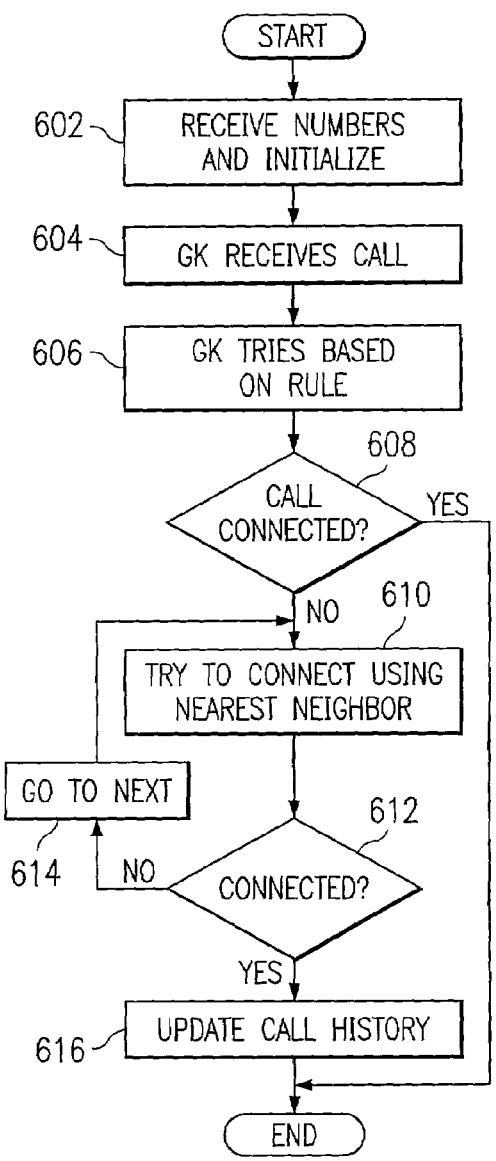
FIG. 6 is a flowchart illustrating operation of an embodiment of the invention.

FIG. 6 is a flowchart illustrating operation of an embodiment of the invention. In a step 602, the gatekeeper 109 is initialized with numbers and users, and the time based connection rules associated with the user. In step 604, the gatekeeper 109 receives a call request. In step 606, the gatekeeper 109 attempts to connect the call based on the rules set for the user. If the call is not connected, as determined in 608, the gatekeeper 109 tries to connect using a nearest neighbor procedure, in step 610. (It is assumed here that there are enough records to perform this procedure; otherwise, a learning procedure as described with reference to FIG. 4 may be used). If in 610, the call is connected then the call history is updated, in step 615. Otherwise, in step 614, the system proceeds to the next in line and tries to connect to the next nearest neighbor. It is noted that, in addition, in certain embodiments, the call history may be cleared after a predetermined period.

Figure 7:
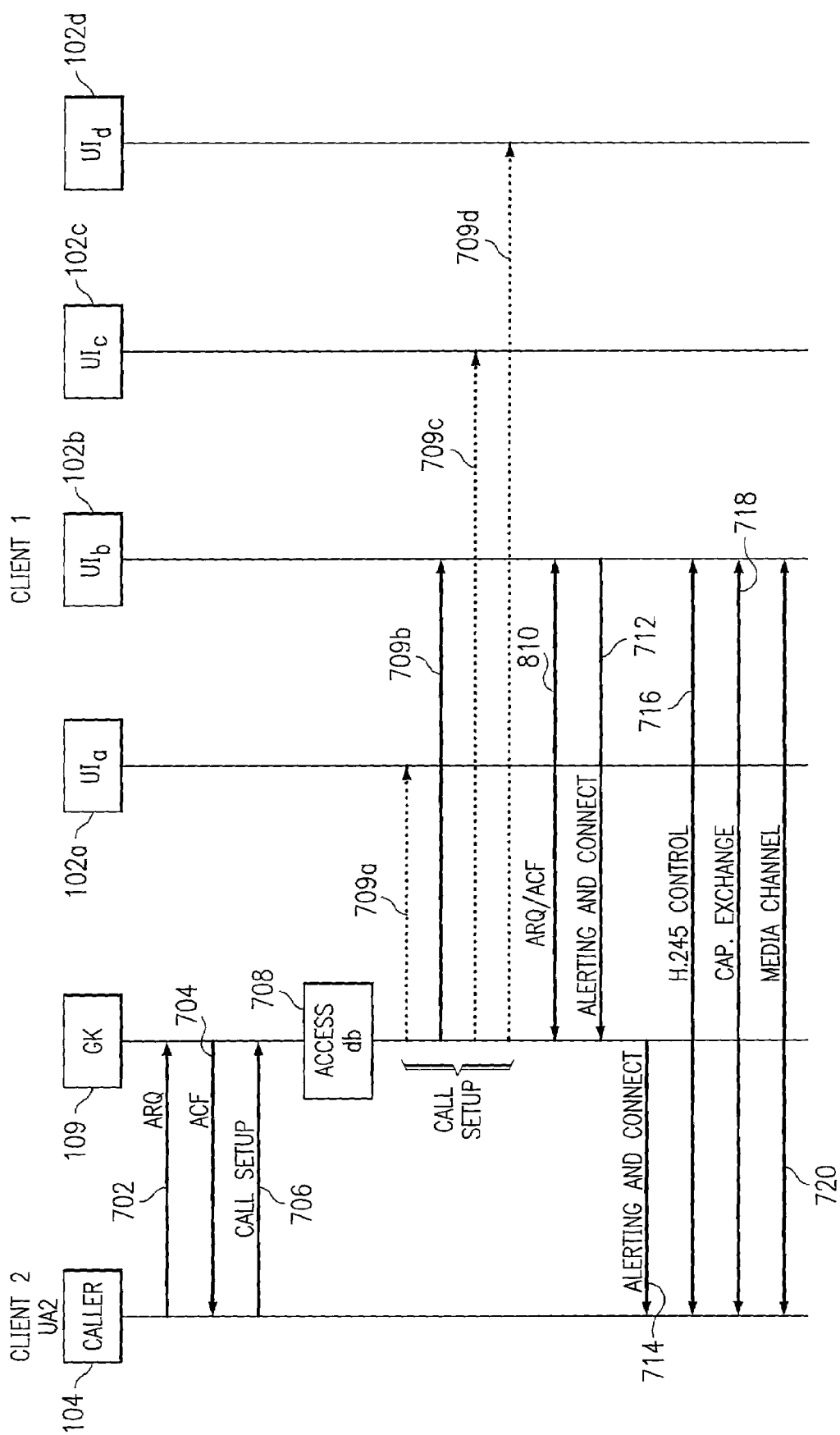
FIG. 7 is a diagram illustrating signal flow according to an embodiment of the invention.

FIG. 7 illustrates signal flow for system operation according to one embodiment of the invention. Shown schematically are a caller (UA2) 104, called party with several numbers 102a–102d, and a gatekeeper 109. If the endpoint UA2 wants to establish a call to another user Ul the endpoint UA2 sends an ARQ message (AdmissionRequest) 702 to the gatekeeper GK 109. It is noted that, while the endpoint UA2 is illustrated as being a LAN client, a similar procedure is made when an external call is received. In that case, however, the signaling is via the gateway GW (FIG. 1). Similarly, while the numbers associated with the user agent 102 may all be LAN numbers, in practice, one or more will be off-network and thus, accessible via a gateway. For simplicity, such gateway signaling is omitted.

Turning back to FIG. 7, the gatekeeper GK 109 responds to the ARQ with an ACF (Admission Confirm) message 704 to UA2. Next, in response to the ACF message, the UA2 sends an H.225.0 set-up message 706 to the gatekeeper GK 109. The Call Setup message includes the identity of the called party.

In 708, the gatekeeper 109 then accesses the database in memory 208 to determine where to route the call. If there is no data in the database from which to make the closest neighbor determination, the gatekeeper GK 109 will send the call setup message, in order, to the numbers associated with the Client 1 until one picks up. Thus, for example, the gatekeeper 109 will send the call setup 709a to the Ula, then call setup 709b to the user at Ulb, then the call setup 709c to the user at Ulc, and finally, the call setup 709d to the user at Uld.

However, if the database has a record sufficient for the closest neighbor determination, then the gatekeeper 109 will perform the determination and route the call setup message to the appropriate destination. In the example illustrated, the call setup message is sent to the user 1 at Ulb 102b. In response, the endpoint Ulb conducts an ARQ/ACF exchange 710 with the gatekeeper GK 109. The endpoint Ulb 102b then sends H.225.0 Alerting and Connect messages 712 to the gatekeeper GK 109 as the call progresses to the connect state. The gatekeeper GK 109, in turn provides the Alerting and Connect messages 714 to the endpoint UA2. The Alerting or Connect message includes the Gatekeeper H.245 Control Channel Transport Address, which is used to establish the H.245 control channel 716. Next, an H.245 capability exchange 718 is undertaken. Finally, the media channel 72—is opened between endpoint Client 1 and Client 2.

Figure 8:
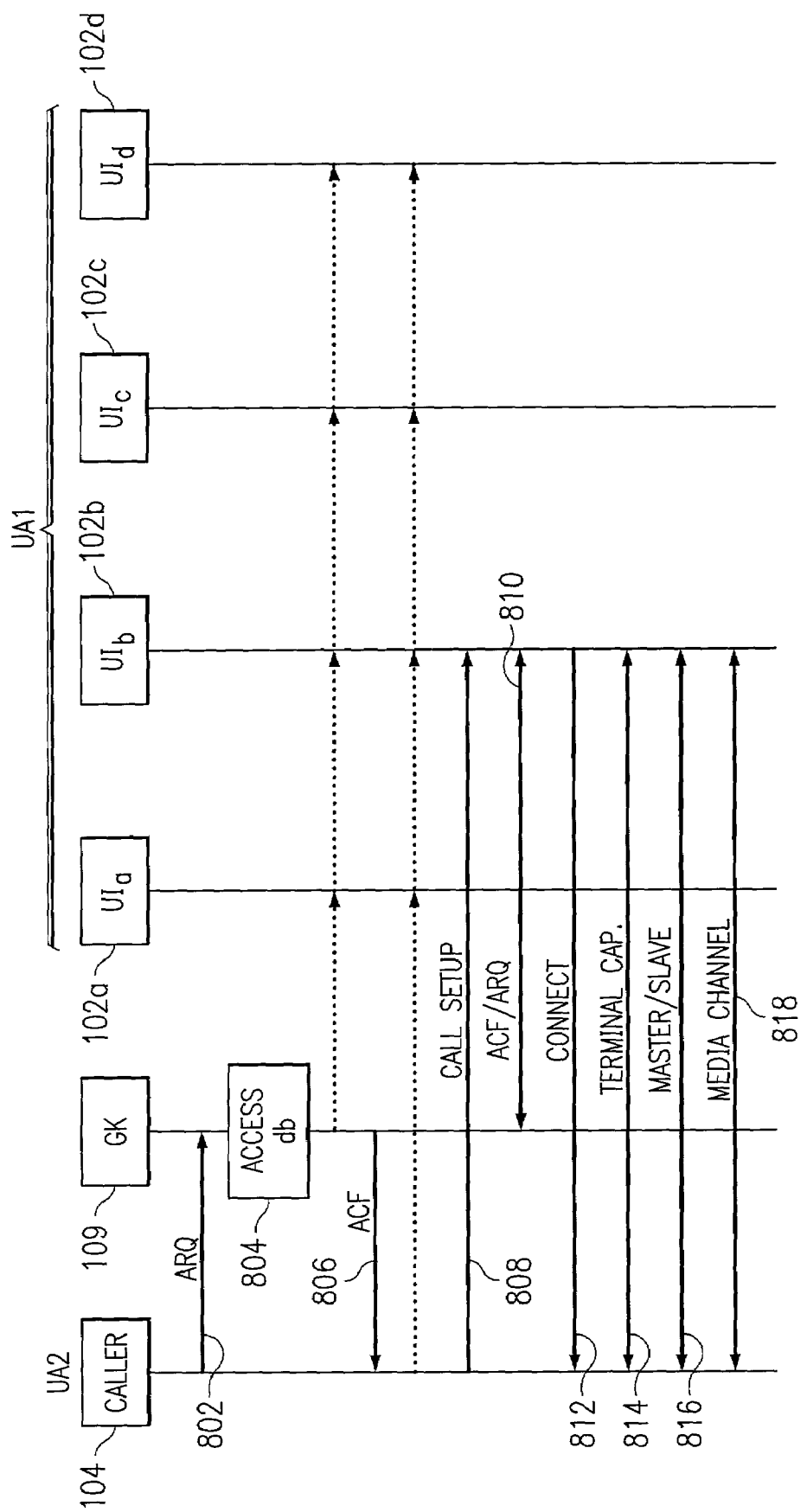
FIG. 8 is a diagram illustrating signal flow according to an embodiment of the invention.

FIG. 8 illustrates signaling for another implementation of the invention. As in FIG. 7, shown are a user agent UA1 having four numbers 102a-102d, a user agent UA2 104, and a gatekeeper 109. Again, the UA2 104 and the Ul 102a–102d may be LAN devices or external devices coupled via one or more gateways.

In 802, the UA2 104 sends an ARQ message to the gatekeeper GK 109 requesting that a call to endpoint Ul be allowed using a direct call model. In 804, the gatekeeper 109 determines where to route the call. For example, the gatekeeper 109 may access the caller database and perform the nearest neighbor determination described above. In the example illustrated, Ulb is chosen. Then, the gatekeeper GK 109 responds with an ACF message 806 to the endpoint UA2. The ACF message 806 includes a Call Signaling Transport Channel Address of the endpoint Ul and may in particular include the number as determined by the closest neighbor calculation. In response to the ACF message 806, the UA2 sends an H.225.0 Setup message 808 directly to endpoint Ulb. (If the specific number was not provided, then the UA2 would serially try the numbers associated with the Ul). In response to the setup message, the endpoint Ua1b conducts an ARQ/ACF exchange 810 with the gatekeeper GK 109. Next, the endpoint UA1b sends an H.225.0 Connect message 812 to the endpoint UA2 to progress the call to a connect state. The endpoint UA2 and U1b then exchange H.245 terminal capability messages 814. The endpoints next exchange H.245 master-slave determination messages 816 and any other needed H.245 messages, and establish the media channel 818.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications system, comprising:
   a local area network;
   one or more telecommunications devices coupled to said local area network;
   a switching unit coupled to said local area network, said switching unit adapted to associate a plurality of numbers with a user, record a time and associated number at which said user has been reached, and perform a closest neighbor time comparison of multiple records of previous calls to determine where to connect a current call.

2. A telecommunications system in accordance with claim 1, said switching unit further adapted to switch calls to said user at particular locations at programmed times.

3. A telecommunications system in accordance with claim 2, said switching unit comprising an H.323 gatekeeper.

4. A telecommunications gatekeeper, comprising:
   a control processor adapted to process incoming and outgoing calls, wherein users have one or more numbers associated with them;
   a record unit adapted to store in a memory a call history associated with particular users; and
   a compare unit adapted to perform a closest time neighbor comparison of multiple calls in said call history to determine at which of said one or more numbers to connect the call.

5. A telecommunications gatekeeper in accordance with claim 4, said control unit programmable to switch calls to said users at particular numbers at particular times.

6. A telecommunications gatekeeper in accordance with claim 5. said compare unit adapted to perform said closest neighbor comparison if a call is not connected to a programmed number at the programmed time.

7. A telecommunications gatekeeper in accordance with claim 4, wherein said call history is updated after every call.

8. A telecommunications gatekeeper in accordance with claim 4, wherein said call history is cleared after a predetermined period.

9. A method, comprising:
   maintaining a call history of calls to one or more numbers of a particular user;
   receiving a new call;
   performing a closest neighbor time comparison of multiple calls in said call history to determine at which of said numbers to switch said new call;
   connecting said new call; and
   updating said call history.

10. A method in accordance with claim 9, further comprising first attempting to switch a call to a user-programmed time associated call location.

11. A method in accordance with claim 10 further comprising clearing said call history after a predetermined period has elapsed.

12. A method, comprising:

providing a control processor adapted to process incoming and outgoing calls, wherein users have one or more numbers associated with them;

providing a record unit adapted to stare in a memory a call history associated with particular users; and providing a compare unit adapted to perform a closest neighbor time comparison of multiple calls in said call history to determine at which of said one or more numbers to connect the call.

13. A method in accordance with claim 12, said control unit programmable to switch calls to said users at particular numbers at particular times.

14. A method in accordance with claim 13, said compare unit adapted to perform said closest neighbor comparison if a call is not connected to a programmed number at the programmed time.

15. A method in accordance with claim 14, wherein said call history is updated after every call.

16. A method in accordance with claim 14, wherein said call history is cleared after a predetermined period.

* * * * *